(12) United States Patent
Lund et al.

(10) Patent No.: US 10,876,650 B2
(45) Date of Patent: Dec. 29, 2020

(54) DUAL CYLINDER PRESSURE EQUALIZATION SYSTEM

(71) Applicant: Betts Industries, Inc., Warren, PA (US)

(72) Inventors: Patrick Lund, Russell, PA (US); David J. Adams, Warren, PA (US)

(73) Assignee: Betts Industries, Inc., Warren, PA (US)

( * ) Notice: Subject to any disclaimer, the term of this patent is extended or adjusted under 35 U.S.C. 154(b) by 17 days.

(21) Appl. No.: 16/000,524

(22) Filed: Jun. 5, 2018

(65) Prior Publication Data

US 2018/0347717 A1 Dec. 6, 2018

Related U.S. Application Data

(60) Provisional application No. 62/515,495, filed on Jun. 5, 2017.

(51) Int. Cl.
*F16K 31/122* (2006.01)

(52) U.S. Cl.
CPC ...... *F16K 31/1221* (2013.01); *F16K 31/1225* (2013.01); *F16K 31/1226* (2013.01)

(58) Field of Classification Search
CPC ............. F16K 31/1221; F16K 31/1226; F16K 31/1225
See application file for complete search history.

(56) References Cited

U.S. PATENT DOCUMENTS

| 3,451,423 A * | 6/1969 | Priese | F16K 31/1225 |
| | | | 137/556 |
| 3,752,174 A * | 8/1973 | Turolla | B08B 9/00 |
| | | | 137/491 |
| 3,866,623 A * | 2/1975 | Klimek | B60T 11/326 |
| | | | 137/102 |
| 3,958,584 A * | 5/1976 | Jones | A01J 7/025 |
| | | | 134/56 R |
| 10,066,588 B2 * | 9/2018 | Van Lant | F16K 17/08 |

* cited by examiner

*Primary Examiner* — Eric Keasel
(74) *Attorney, Agent, or Firm* — Jonathan M. D'Silva; MMI Intellectual Property

(57) ABSTRACT

A pressure equalization valve comprises a first pressure cylinder, a second pressure cylinder, an aperture, and a stationary member. The stationary member is located between the first pressure cylinder and the second pressure cylinder. The second pressure cylinder is located within the aperture. A primary piston is located within the first pressure cylinder and a secondary piston is located within the second pressure cylinder. A stem is directly connected to the aperture and the primary piston. The stem includes a fluid passage between the first pressure cylinder and the second pressure cylinder. When a pressurized fluid is introduced into the first pressure cylinder, the pressurized fluid pushes the primary piston and the stem to open the aperture in a linear direction, the pressurized fluid travels to the second cylinder through the fluid passage and pushes against the aperture in the same direction as said first piston further opening the aperture.

5 Claims, 4 Drawing Sheets

DUAL CYLINDER PRESSURE EQUALIZATION SYSTEM

BACKGROUND

Volatile liquids are often transported in cargo tanks mounted to tractor trailers, trains, or other vehicles. Depending on the type of liquid being transported there are requirements for the capture of vapor for public safety and environmental concerns. Vapor valves are used to allow the capture of vapor from volatile liquids contained in those tanks as well as to provide pressure equalization for when the tank is to be filled or drained. Vapor valves sometimes must open against fluids undergoing thermal expansion or against viscous products that cause the valve member and its O-ring to stick to the body of the valve. In these cases, the vapor valves must open against pressures that may be higher than expected. As an example, a standard vapor valve might be able to open against 15 psi internal tank pressure with typical compressed air as generated by the vehicle. However, the inability for such standard vapor valves to open against higher pressures precludes them from being used on most, if not all, crude oil tank trucks.

Crude oil typically generates a higher vapor pressure than most petroleum derivatives. Crude oil vapor is transitioned in and out of these tanks during the loading and unloading phases of crude oil transportation by way of vapor valves. These pressure equalization valves are mounted to the top of the cargo tank and are opened during product transfer to and from the tank to stabilize the internal pressure of the tank and prevent rupture or implosion. These valves can open to the atmosphere or can be part of a closed loop system meant to contain the vapors. Due to the high working pressure of these tanks, it is necessary for the vapor valve to be able to open against internal tank pressures as high as 35 psig using standard truck air system line pressure (typically between 80 psig and 120 psig).

A common way to increase opening force of such valves would be to increase the internal piston size, but the valve size is limited by the envelope of the existing valve and flow capacity requirements against which a larger piston would impinge. Likewise, a second air cylinder added to the top of the valve would double the opening force, but height restrictions at the top of the valve and high manufacturing costs make this infeasible.

SUMMARY

A pressure equalization valve comprises a first pressure cylinder, a second pressure cylinder, a valve member, and a stationary member. The stationary member is located between the first pressure cylinder and the second pressure cylinder. The second pressure cylinder is located within the valve member. A primary piston is located within the first pressure cylinder and a secondary piston is located within the second pressure cylinder. A stem is directly connected to the valve member and the primary piston. The stem includes a fluid passage between the first pressure cylinder and the second pressure cylinder such that when a pressurized fluid is introduced into the first pressure cylinder, the pressurized fluid pushes the primary piston and the stem to begin to open the valve member in a linear direction, the pressurized fluid travels to the second cylinder through the fluid passage and pushes against the valve member in the same direction as said first piston further causing the valve member to open.

The secondary cylinder is pushed against the stationary member in the opposing direction of the pressure cylinder when the pressurized fluid flows through the fluid passage. The pressurized fluid is typically compressed air. The pressure equalization valve is typically mounted such that the valve member opens into a pressurized system which in turn opens to a lower pressure system.

In some embodiments, the stem of the pressure equalization valve has a spring that biases the valve member in the closed position. In other embodiments, the valve member opens into a pressurized system and the valve member is maintained in the closed position by the pressure exerted against it by the pressurized system to which it opens.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

What is presented is an improved pressure equalization valve that can be used in cargo tanks that carry fluids that generate high internal tank pressures. The valve system presented increases the force available by the internal assemblies of the valve without significantly increasing the outer dimensions of the valve while maintaining the fluid flow capacity requirements of such valves. This is accomplished by incorporating a dual cylinder configuration in which a first pressure cylinder pushes against a stationary member to open a valve member in a linear direction. A direct fluid connection extends between the first pressure cylinder and a second pressure cylinder. This second pressure cylinder acts against the same stationary member in the opposing direction of the first pressure cylinder and also includes a second piston that applies an additive force directly against the valve member further increasing the opening force against the valve member.

Figure 1:
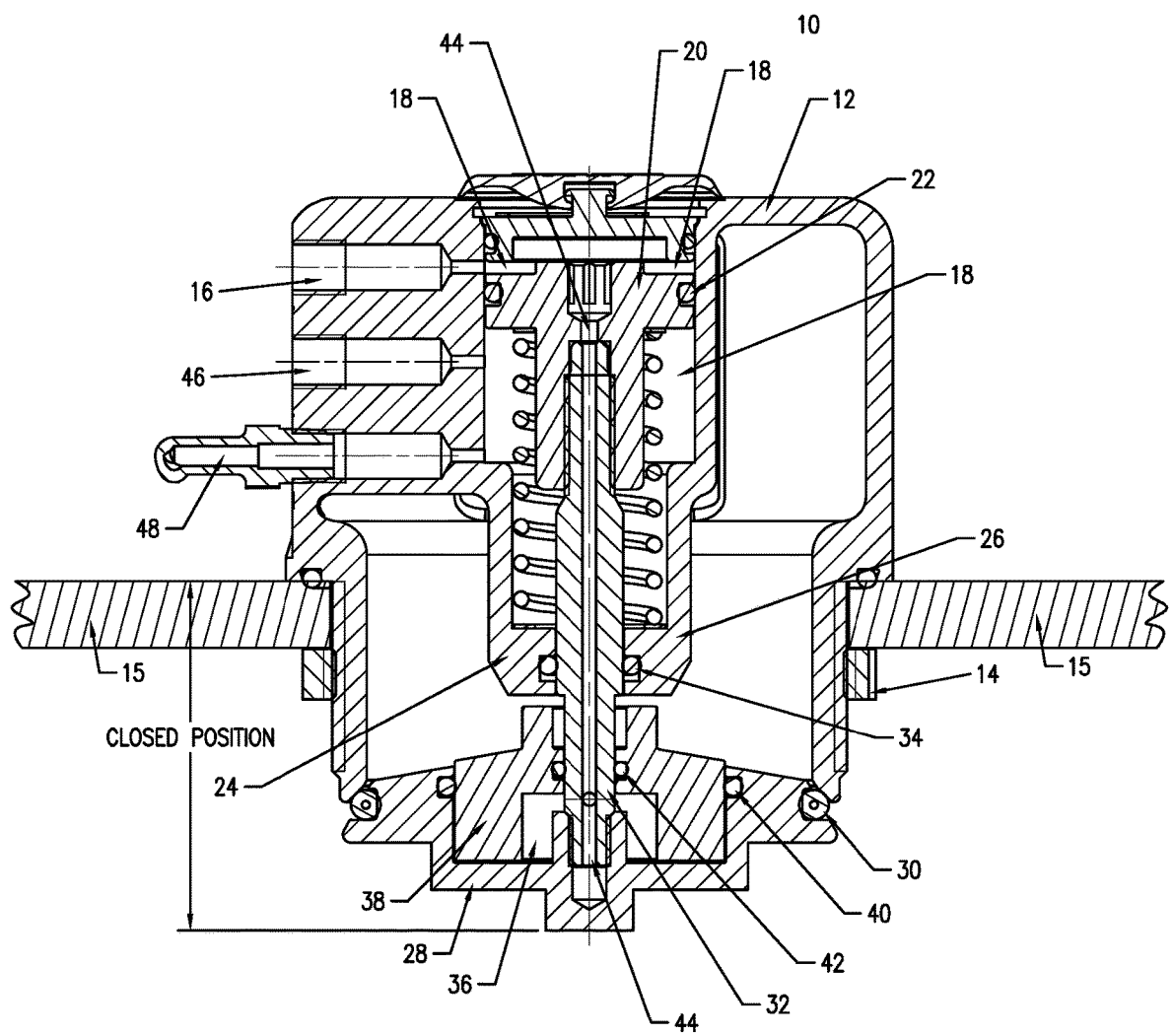
FIG. 1 is a cross-sectional view of a pressure equalization valve in the closed position.
Figure 1A:
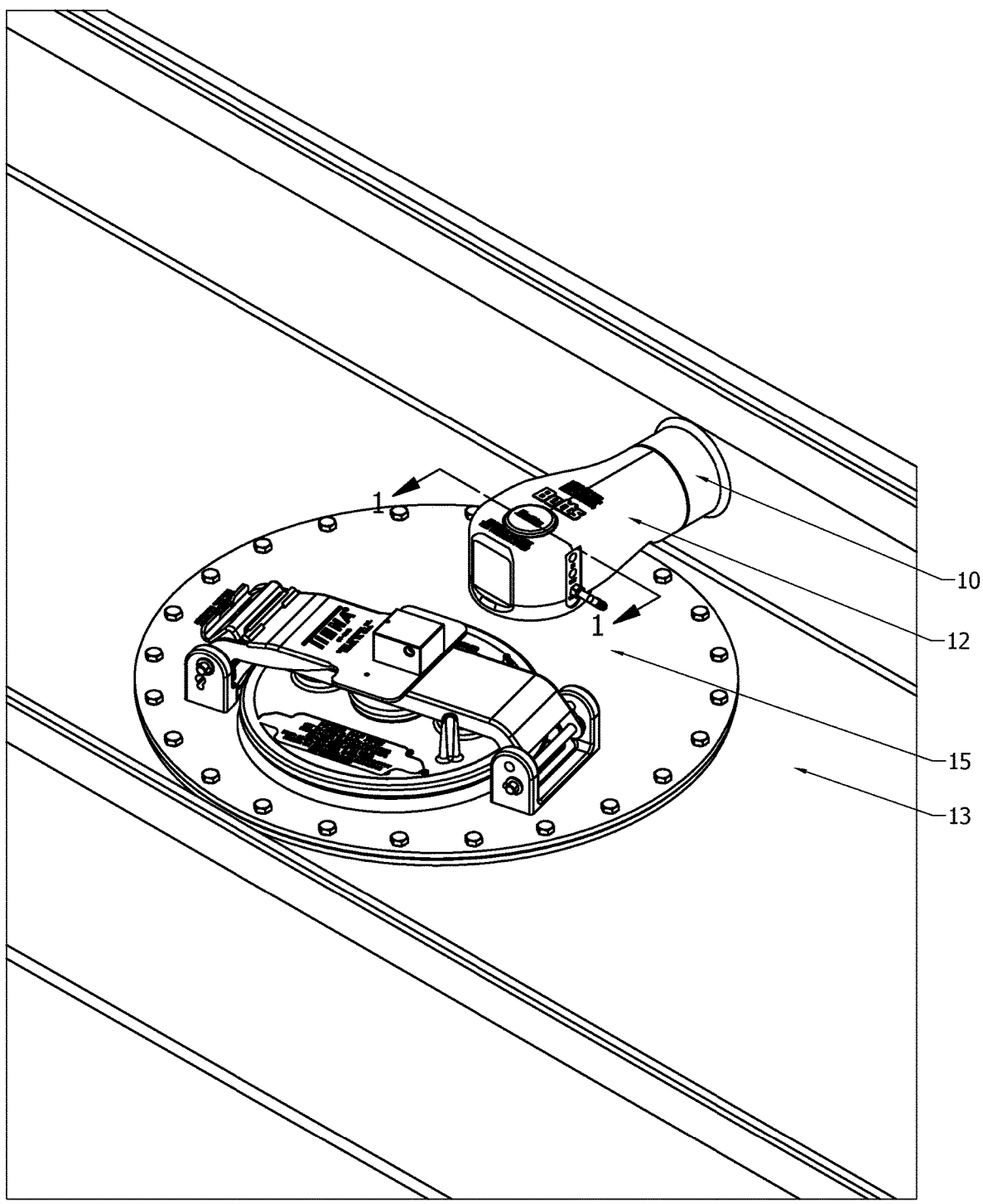
FIG. 1A is a perspective view of a pressure equalization valve mounted to the top of a tank.

The figures illustrate the preferred embodiment of the pressure equalization valve 10. Referring to FIG. 1A, the pressure equalization valve 10 comprises a valve body 12 that mounts to the top of a tank 13. In the illustration, the valve 10 is mounted to a manhole cover 15 that allows access to the inside of the tank 13, and for all purposes forms part of the wall of the tank 13. The valve 10 is mounted as shown in FIG. 1 by tightening the threaded retaining ring 14 to seal the O-ring of the manhole cover 15. The portion of the valve body 12 above the retaining ring 14 is outside the tank 13 the portion of the valve body 12 below the retaining ring 14 is within the tank 13. The tank 13 can hold its contents at above atmospheric pressure and therefore atmospheric pressure is lower than the pressure in the tank 13.

The pressure equalization valve 10 comprises an inlet port 16 that connects to a first pressure cylinder 18. A primary piston 20 is located within the first pressure cylinder 18. An O-ring 22 may be included to form a seal between the primary piston 20 and the walls of the first pressure cylinder 18. A stationary member 24 is located at the bottom of the first pressure cylinder 18. A spring 26 is biased between the primary piston 20 and the stationary member 24 to hold the primary piston 20 up against the top of the first pressure cylinder 18.

A valve member 28 is located below the retaining ring 14 in the portion of the valve body 12 within the manhole cover 15 of the tank 13. The valve member 28 includes an O-ring 30 that forms a seal between the valve member 28 and the valve body 12. A stem 32 is mounted and fixed to the valve member 28 and the primary piston 20 such that the movement of the stem 32 would move both the primary piston 20 and the valve member 28. The stem 32 extends through the stationary member 24. An O-ring 34 is located in the stationary member 24 to form a seal between the stem 32 and the stationary member 24.

A second pressure cylinder 36 is located within the valve member 28. A secondary piston 38 is located within the valve member 28 and mounted to the stem 32 however the secondary piston 38 is free to move along the stem 32. An O-ring 40 forms a seal between the secondary piston 36 and the valve member 28. An O-ring 42 forms a seal between the secondary piston 36 and the stem 32.

The stem 32 includes a fluid passage 44 between the first pressure cylinder 18 and the second pressure cylinder 36.

Figure 2:
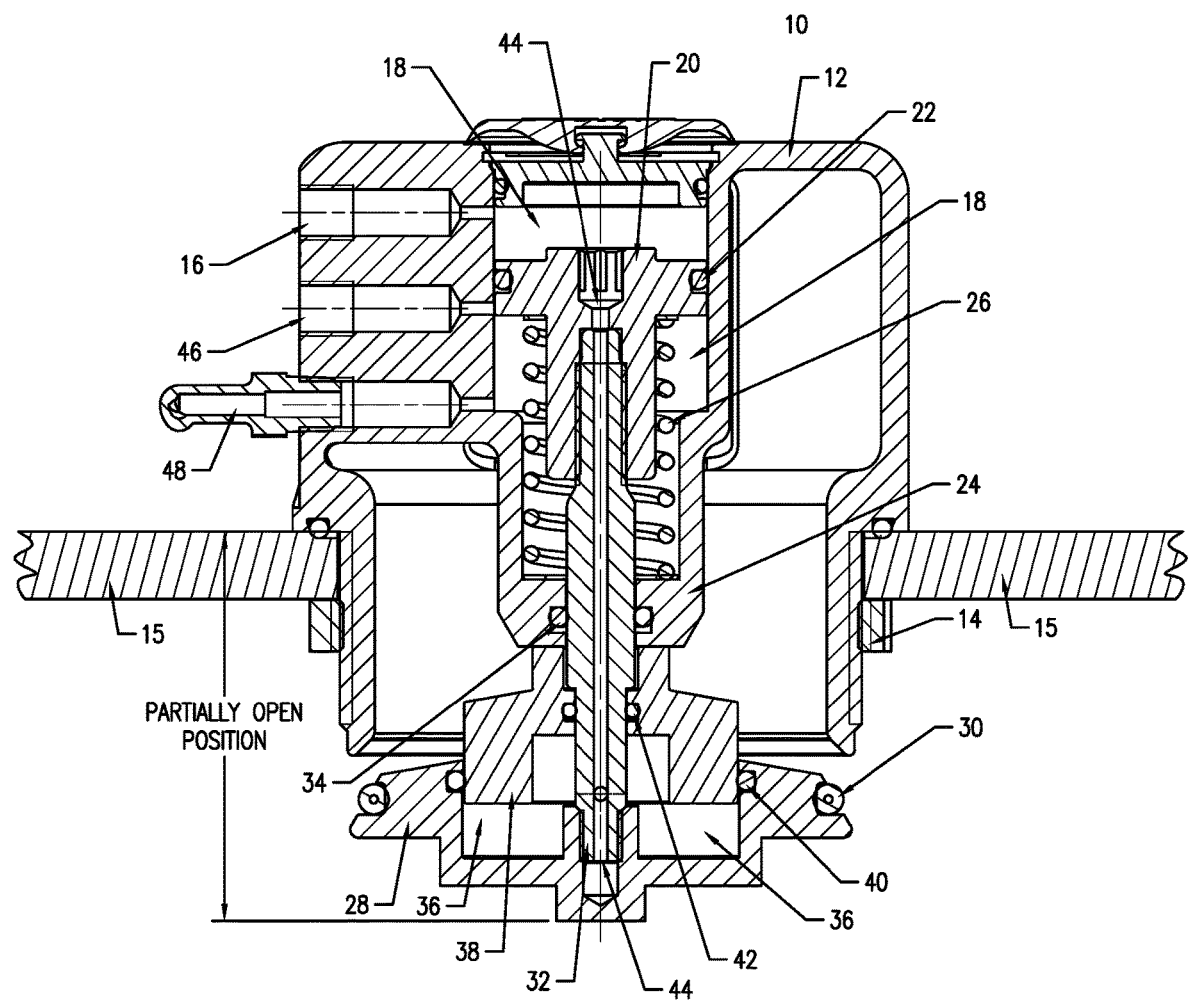
FIG. 2 is a cross-sectional view of the pressure equalization valve of FIG. 1 partially open.
Figure 3:
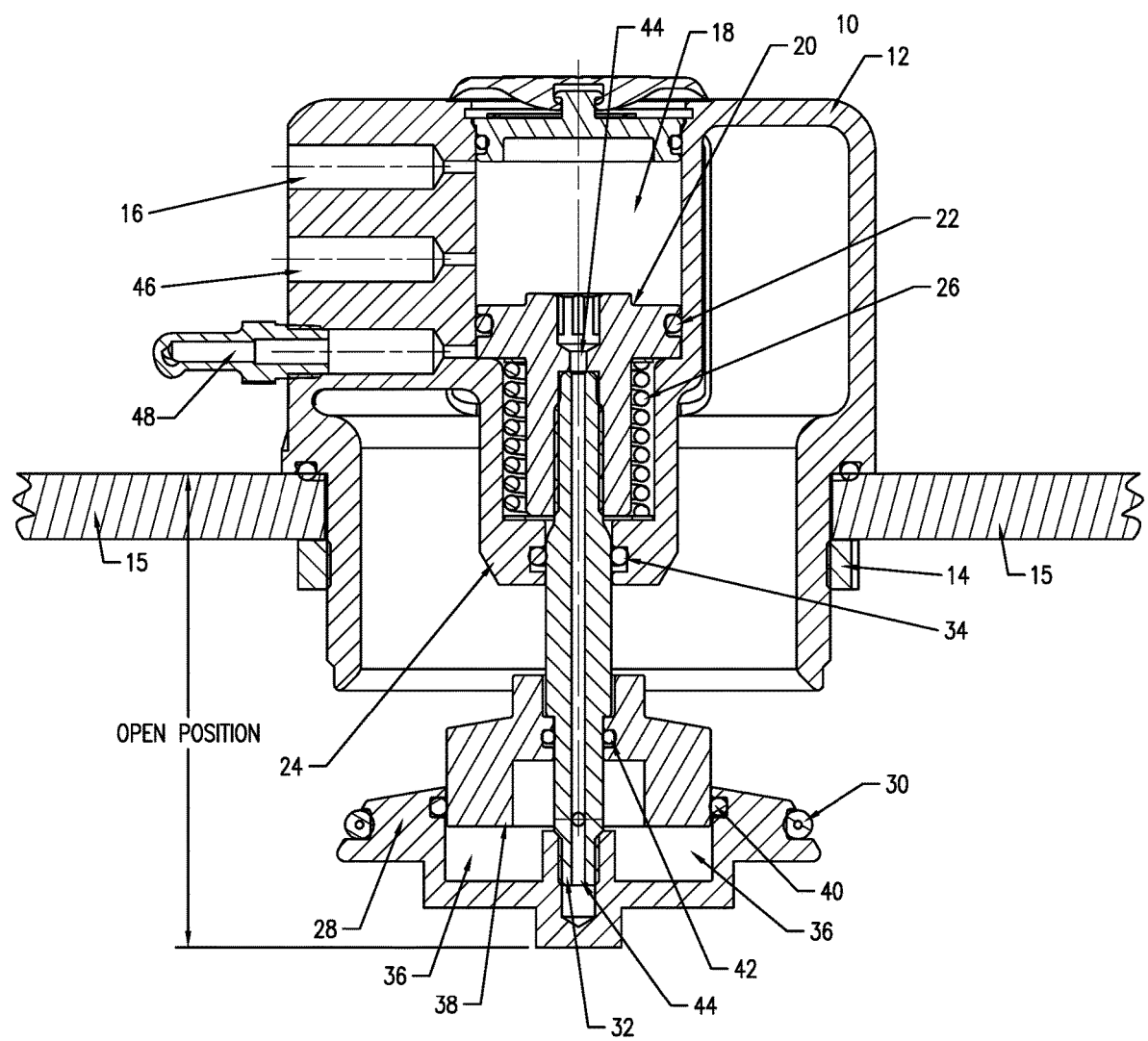
FIG. 3 is a cross-sectional view of the pressure equalization valve of FIG. 1 in the fully open position.

As best understood by comparing FIGS. 1 through 3, the pressure equalization valve 10 must be activated for the tank 13 onto which it is mounted to be drained. To do so, pressurized fluid (typically compressed air) is introduced to the inlet port 16. The pressurized fluid exerts downward pressure on the primary piston 20. Pressurized fluid is also carried through the stem 32 through the fluid passage 44 and into the second pressure cylinder 36 formed by the pocket between the secondary piston 38 and the valve member 28. The pressurized fluid exerts a force upward on the secondary piston 38 and an equal downward force on the valve member 28. The secondary piston 28 is pushed up against the stationary member 24. The combined force of pressurized fluid pushing down the primary piston 20 and valve member 28 causes the valve 10 to open partially as shown in FIG. 2. Partial opening allows the pressure equalization valve 10 to begin to release pressure from the tank 13. As the difference between the internal tank pressure and the vapor system pressure or atmospheric pressure decreases, so does the force on the valve member 28, which allows the pressure equalization valve 10 to move to the fully open position shown in FIG. 3, fully venting the tank 13. When air pressure is released from the inlet port 16, the spring 26 pulls the primary piston 20 back up into the first pressure cylinder 18 and the returns the valve member 28 back into the closed position shown in FIG. 1.

In the embodiments shown, the spring 26 biases the valve member 28 in the closed position. In other embodiments, the valve member 28 is maintained in the closed position by the pressure exerted against it by the pressurized system to which it opens.

The second pressure cylinder 36 increases the internal pressure that the pressure equalization valve 10 can open against. The location of the secondary pressure cylinder 36 inside the valve member 28 saves space and does not increase the overall height of the pressure equalization valve 10, which is necessary to keep the pressure equalization valve 10 as short as possible. The second pressure cylinder 36 works in tandem with the first pressure cylinder 18 to provide the initial opening force required to overcome the pressure in the tank 13 onto which the pressure equalization valve 10 is mounted and begin the equalization of pressure between the tank 13 and the vapor system. The internal pressure in the tank 13 may be around 35 prig.

Once the pressure differential between the tank 13 and the vapor system has decreased to approximately 15 psi, the pressure equalization valve 10 will fully open by way of the primary piston 20 and fully vent the tank 13. The stroke of the secondary piston 38 is only enough to open the pressure equalization valve 10 approximately ¼ inch; the primary piston 20 is responsible for the remaining displacement of the valve member 28. This pressure equalization valve 10 has enough flow capacity in the initial stage to equalize the pressure in a few seconds.

Some embodiments of pressure equalization valves 10 include an interlock port 46 and a vent port 48 on the valve body 12. The interlock port 46 is in direct pressure-fluid connection to the vent port 48 when the valve member 28 is in the closed position. The interlock port 46 is used to enable multiple pressure equalization valves 10 to be connected and to operate in series such that fluid outflow from one interlock port 46 is connected to the inlet port 16 of the next pressure equalization valve 10. When pressurized fluid is introduced into the inlet port 16 to pressurize the first pressure cylinder 18 and pushes the primary piston 20 downward, the pressurized fluid can move into the interlock port 46 and then onto the next pressure equalization valve 10 in series. In this way, many pressure equalization valves 10 can be opened in sequence by running lines from one interlock port 46 to the next pressure equalization valve's 10 inlet port 16, and so on. Since the pressurized fluid only passes to the interlock port 46 after the primary piston 20 has moved downward and the valve member 28 has opened slightly, pressurized fluid passing the interlock port 48 is a positive signal of the pressure equalization valve 10 being open which can be used to trigger a switch or indicator.

The vent port 48 is in direct fluid connection with the atmosphere. It allows any pressure equalization valves 10 that were charged through the interlock port 46 to exhaust back to the vent port 48 and into the atmosphere after the primary piston 20 passes back above the interlock port 46. The vent port 48 also equalizes the pressure on the first pressure cylinder 18 to prevent pressure build up that could hinder the opening of the valve 10.

This invention has been described with reference to several preferred embodiments. Many modifications and alterations will occur to others upon reading and understanding the preceding specification. It is intended that the invention be construed as including all such alterations and modifications in so Far as they come within the scope of the appended claims or the equivalents of these claims.

What is claimed is:
1. A pressure equalization valve comprising:
a first pressure cylinder, a second pressure cylinder, a valve member, and a stationary member;
wherein said valve member is a moveable portion of the valve that defines an opening for fluid movement through the valve;
said stationary member is located between said first pressure cylinder and said second pressure cylinder;
said second pressure cylinder is located within said valve member;

a primary piston located within said first pressure cylinder and a secondary piston located within said second pressure cylinder;

a stem directly connected to said valve member and said primary piston;

said stem includes a fluid passage between said first pressure cylinder and said second pressure cylinder such that when a pressurized fluid is introduced into said first pressure cylinder, the pressurized fluid pushes said primary piston and said stem to begin to move said valve member in a linear direction, the pressurized fluid travels to said second pressure cylinder through said fluid passage and pushes said secondary cylinder against said stationary member in the opposing direction of movement than said first pressure cylinder, said secondary cylinder pushes against said valve member in the same direction as said first piston further causing said valve member to move and create the opening in the valve.

2. The pressure equalization valve of claim 1 in which the pressurized fluid is compressed air.

3. The pressure equalization valve of claim 1 in which said valve member opens into a pressurized system which in turn opens to a lower pressure system.

4. The pressure equalization valve of claim 1 in which a spring biases said valve member in the closed position.

5. The pressure equalization valve of claim 1 in which said valve member opens into a pressurized system and said valve member is maintained in a closed position by the pressure exerted against said valve member by the pressurized system to which said valve member opens.

\* \* \* \* \*